(12) United States Patent
Clark et al.

(10) Patent No.: US 11,920,487 B1
(45) Date of Patent: Mar. 5, 2024

(54) GAS TURBINE ENGINE INCLUDING FLOW PATH FLEX SEAL WITH COOLING AIR BIFURCATION

(71) Applicant: Raytheon Technologies Corporation, Farmington, CT (US)

(72) Inventors: Thomas E. Clark, Wells, ME (US); Andrew E. Breault, Bolton, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/956,877

(22) Filed: Sep. 30, 2022

(51) Int. Cl.
*F01D 25/14* (2006.01)
*F01D 11/00* (2006.01)
*F02C 7/18* (2006.01)
*F02C 7/28* (2006.01)

(52) U.S. Cl.
CPC ............ *F01D 25/14* (2013.01); *F01D 11/005* (2013.01); *F02C 7/18* (2013.01); *F02C 7/28* (2013.01); *F05D 2250/75* (2013.01); *F05D 2260/232* (2013.01); *F05D 2260/31* (2013.01); *F05D 2260/37* (2013.01)

(58) Field of Classification Search
CPC ...... F01D 25/14; F01D 11/005; F01D 25/246; F01D 25/12; F02C 7/28
See application file for complete search history.

(56) References Cited

U.S. PATENT DOCUMENTS

| | | | |
|---|---|---|---|
| 9,879,556 B2* | 1/2018 | Chuong | F01D 25/162 |
| 10,145,308 B2* | 12/2018 | Roy Thill | F01D 25/246 |
| 11,187,152 B1 | 11/2021 | Happ et al. | |
| 11,408,297 B2* | 8/2022 | Lienau | F01D 11/005 |
| 2014/0366556 A1* | 12/2014 | Banks | F01D 11/005 |
| | | | 415/208.1 |
| 2015/0226132 A1* | 8/2015 | Roy Thill | F01D 25/24 |
| | | | 415/183 |
| 2015/0354386 A1* | 12/2015 | Chuong | F02C 7/28 |
| | | | 415/182.1 |
| 2021/0231023 A1 | 7/2021 | Lienau et al. | |

* cited by examiner

*Primary Examiner* — Eldon T Brockman
(74) *Attorney, Agent, or Firm* — Carlson, Gaskey & Olds, P.C.

(57) ABSTRACT

A gas turbine engine includes a primary flow path fluidly connecting a compressor section, a combustor section and a turbine section. A cooling air flowpath is positioned radially outward of the primary flowpath. A first seal spans from an inner diameter of the cooling air flowpath to an outer diameter of the cooling air flowpath. The first seal includes at least one axial convolution and a plurality of pass through features. A bifurcation feature is positioned downstream of the first seal. The bifurcation feature is configured to direct a portion of an airflow through the first seal into a cooling air passage. A second seal contacts the bifurcation and the first seal, such that fluid radially inward of the bifurcation feature.

19 Claims, 4 Drawing Sheets

GAS TURBINE ENGINE INCLUDING FLOW PATH FLEX SEAL WITH COOLING AIR BIFURCATION

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Gas generator engine utilize a series of rotating airfoils with alternating static airfoils to compress and expand flow path air. The rotating stages are typically supported by a static frame and a shaft bearing system. In the hot section of the engine, there may be significant thermal growth between the flowpath fairings and relatively cooler frame structure. In addition, the flowpath temperatures are often above the operating temperature of most structural materials. This makes the task of effectively sealing such interfaces challenging. Prior art solutions have used sliding piston seals, rigidly-attached flex (aka bellows) seals, or a combination of both. Piston seal have the advantage of accommodating large thermal deflections, but they can suffer from leakage and high wear rates, especially in hot environments. Rigidly attached flex seals eliminate sliding contact and hence have the advantage of no wear and reduce leakage but consume considerably larger design space than a piston ring seal. Therefore, it can be difficult to provide cooling air to downstream components in areas with limited packaging space in hot operating environments due to the combination of a relatively stiff seal design coupled with high temperatures that reduce material temperature capability.

Turbine engine manufacturers continuously seek improvements to engine performance including improvements to thermal, transfer and propulsive efficiencies.

SUMMARY

In one exemplary embodiment a gas turbine engine includes a primary flow path fluidly connecting a compressor section, a combustor section and a turbine section, a cooling air flowpath radially outward of the primary flowpath, a first seal spanning from an inner diameter of the cooling air flowpath to an outer diameter of the cooling air flowpath, the first seal including at least one axial convolution and a plurality of pass through features, a bifurcation feature downstream of the first seal, the bifurcation feature being configured to direct a portion of an airflow through the first seal into a cooling air passage, and a second seal contacting the bifurcation and the first seal, such that fluid passes radially inward of the bifurcation feature.

In another example of the above described gas turbine engine the second seal is one of a w-seal, a feather seal, a bellows seal, a diaphragm seal, and a brush-seal In another example of any of the above described gas turbine engines the at least one axial convolution includes from one to five axial convolutions.

In another example of any of the above described gas turbine engines the at least one axial convolution is three axial convolutions.

In another example of any of the above described gas turbine engines the first seal is connected to the inner diameter of the cooling air flowpath via fastener.

In another example of any of the above described gas turbine engines the first seal is connected to the outer diameter of the cooling air flowpath via a fastener.

In another example of any of the above described gas turbine engines the first seal is press fit to the outer diameter of the cooling air flowpath.

In another example of any of the above described gas turbine engines the first seal is radially outward of a low pressure turbine section.

In another example of any of the above described gas turbine engines the turbine cooling air flowpath is isolated from a purge air cavity.

In another example of any of the above described gas turbine engines the plurality of pass through features includes a first set of purge holes and a second set of purge holes.

In another example of any of the above described gas turbine engines the first set of purge holes fluidly connect the turbine cooling air to a purge air cavity.

In another example of any of the above described gas turbine engines the second set of purge holes fluidly connect the turbine cooling air to the turbine cooling air flowpath.

An exemplary method of bifurcating an airflow within a gas turbine engine includes disposing a flex seal within a cooling air flowpath, the flex seal including at least a first set of pass through holes connecting the cooling air flowpath to a purge cavity and a second set of pass through holes connecting the cooling air flowpath to a cooling air passage, isolating the cooling air passage from the purge cavity using a secondary seal disposed between an end of the cooling air passage and the flex seal, and passing an airflow through the first set of pass through holes and through the second set of pass through holes.

In another example of the above described method of bifurcating an airflow within a gas turbine engine the flex seal includes multiple axial convolutions.

In another example of any of the above described methods of bifurcating an airflow within a gas turbine engine the multiple axial convolutions includes one to five axial convolutions.

In another example of any of the above described methods of bifurcating an airflow within a gas turbine engine the multiple axial convolutions consists of three convolutions.

Another example of any of the above described methods of bifurcating an airflow within a gas turbine engine further includes maintaining the flex seal in position relative a radially inner diameter via at least one fastener, the at least one fastener protruding through the flex seal and a corresponding flange.

Another example of any of the above described methods of bifurcating an airflow within a gas turbine engine further includes maintaining the flex seal in position against a radially outer diameter via a press fit.

In another example of any of the above described methods of bifurcating an airflow within a gas turbine engine the secondary seal is one of a w-seal, a feather seal, a bellows seal, a diaphragm seal, a brush-seal.

These and other features disclosed herein can be best understood from the following specification and drawings, the following of which is a brief description.

DETAILED DESCRIPTION

Figure 1:
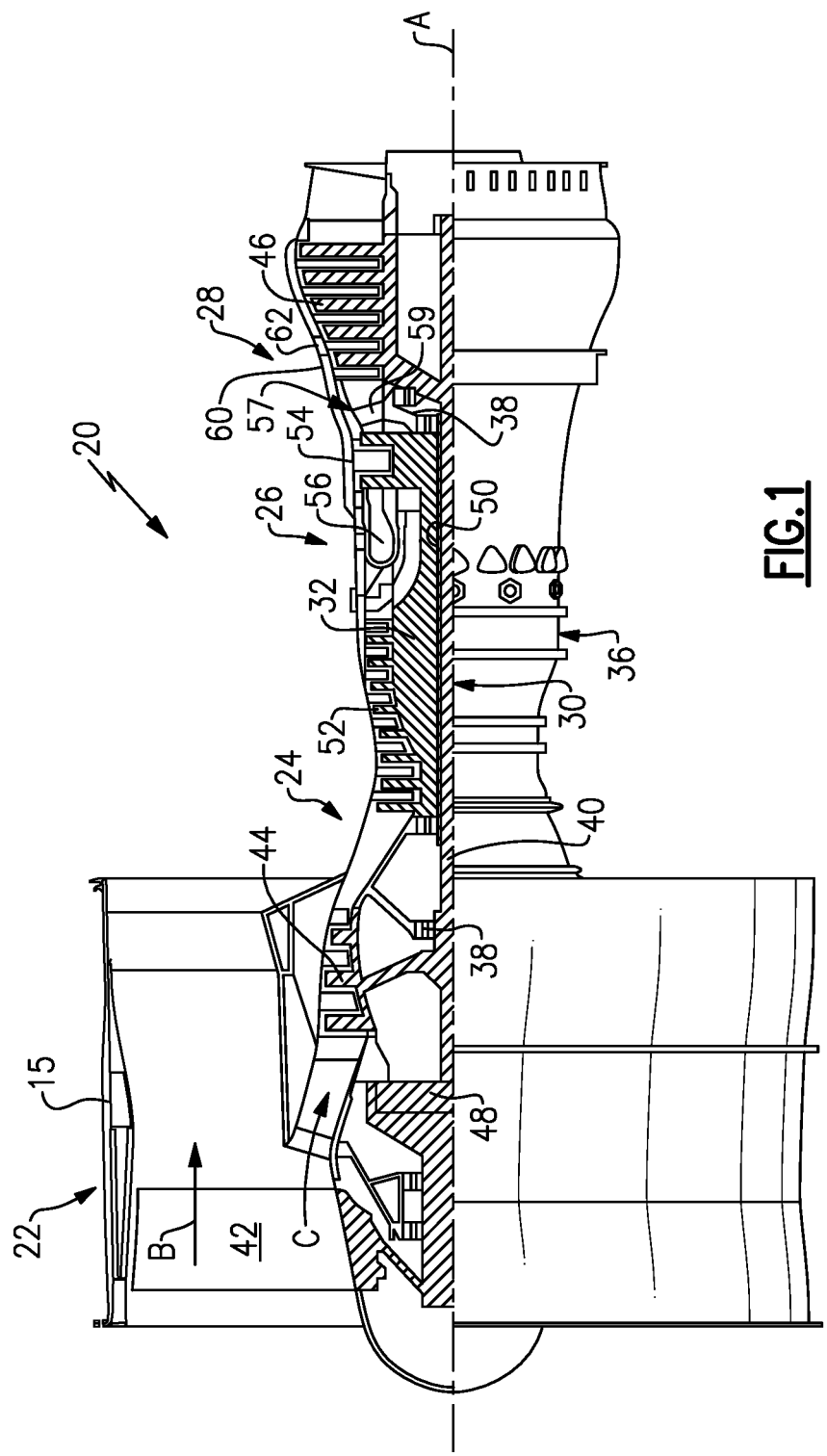
FIG. 1 is a schematic view of an example gas turbine engine including an flow path flex seal with cooling air bifurcation.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Gas turbine engines, such as the engine of FIG. 1, utilize a series of rotating airfoils alternating with static airfoils to compress and expand flowpath air. The rotating stages are supported by a static frame and shaft bearing system. At the interfaces between static frames and flowpath fairings, adjacent to rotating stages, it is desired to limit windage due to recirculating air and also to seal component cooling air from the hot flowpath air. Radially outward of the primary flowpath, and radially inward of an engine casing, is a turbine cooling air flowpath 60. The turbine cooling air flowpath 60 includes a flex seal configuration 62 that bifurcates the airflow into a turbine cooling flow and a purge flow. The bifurcation helps reduce windage due to recirculating air and seals the component cooling air from the hot flowpath.

Figure 2:
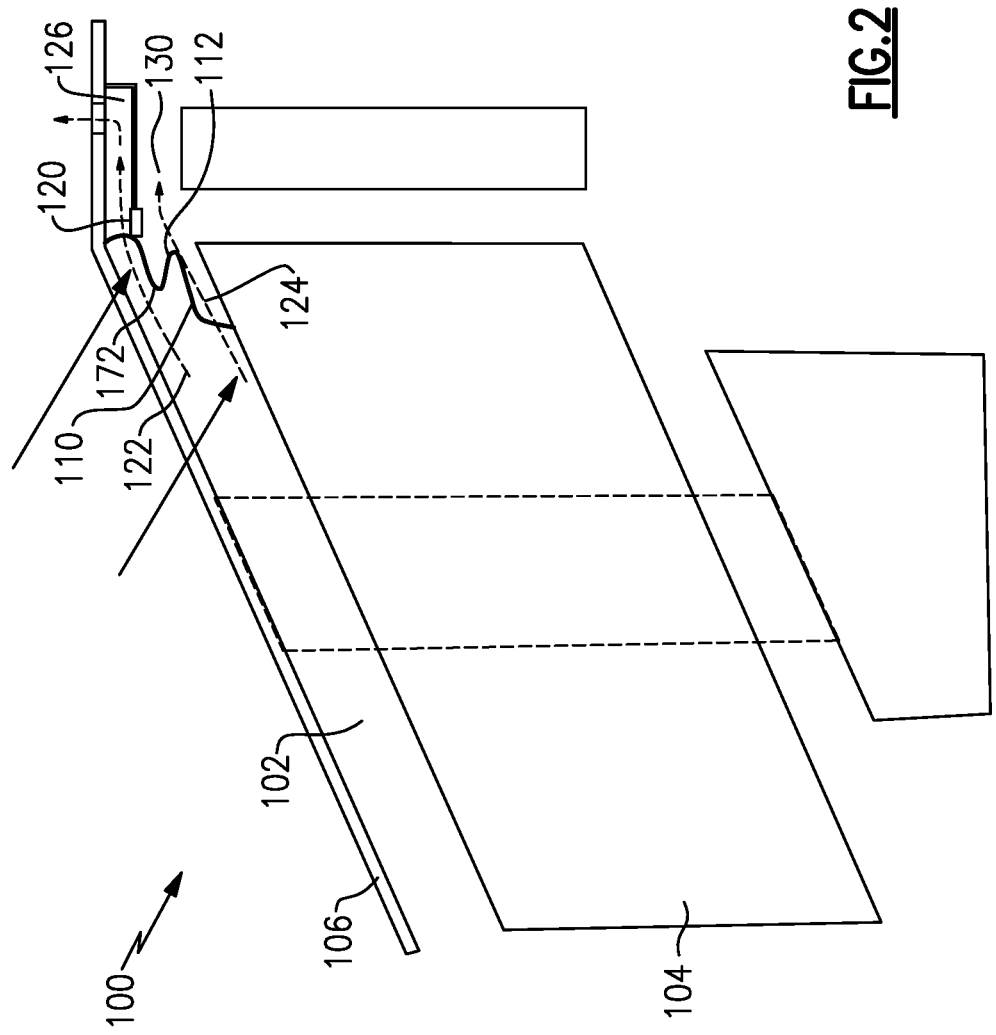
FIG. 2 is a schematic view of a portion of a gas turbine engine including a flow path flex seal.

FIG. 2 is a schematic view of a portion of a gas turbine engine including a flow path flex seal 110 paired with secondary seal 120. The flex seal and the secondary seal are disposed in a turbine cooling air flowpath 102 radially outward of the primary flowpath 104 and radially outward of an engine casing 106. In the illustrated example, the outer diameter of the turbine cooling air flowpath 102 is defined by the engine casing and the inner diameter of the turbine cooling air flowpath 102 is defined by an outer diameter of the primary flowpath 104. The section 100 of the gas turbine engine illustrated is a "hot section" where the primary flowpath is exposed to extreme temperatures resultant from combustion products in the combustor section 26.

The flex seal 110 extends a full span of the turbine cooling air flowpath 102 from the primary flowpath 104 to the engine casing 106. To further assist in the thermal management, and the stress control, the flex seal includes axial convolutions 112. As used herein a convolution is a portion of the flex seal 110 that reverses the direction of the flex seal 110 relative to the axis defined by the engine. In alternate examples, the flex seal 110 can include any number of convolutions 112. In some specific examples, the flex seal includes one, two, or three convolutions. In one configuration, the flex seal includes between two and five convolutions. The flex seal configuration with convolutions aids in stress management by reducing the stiffness (spring constant) of the seal. The seal is designed for a target magnitude of displacement and to a desired stress state, and proportionally the internal force within the seal. Both the shape of the seal (e.g. the particular curvature of the convolutions), and the number of convolutions, is a design parameter that can be adjusted to tune the stiffness of the seal for a particular engine and/or particular locations within an engine. Thermal management is similarly provided via reduction in stiffness. The seal will grow non-uniformly under heat, and so compliance is desirable to minimize internal stresses In one example, the flex seal 110 is fastened to the inner diameter of the turbine cooling air flowpath 1023 using a fastener (illustrated in FIG. 3), and can be either fastened to the outer diameter using a fastener or maintained against the outer diameter of the turbine cooling flowpath via a press fit configuration. Fluid in the turbine cooling air passage 102 is split at the flex seal 112 between a first flow 122 and a second flow 124, both of which pass through openings in the flex seal 110. The outer flow 122 (first flow 122) enters a cooling air passage 126, which provides the air to a turbine cooling system. The inner flow 124 (second flow 124) enters a purge cavity 130. The fluid entering the purge cavity 130 is at a higher pressure than the fluid in the primary flowpath 104, and ensures that there is no leakage from the primary flowpath into the cooling air passage 102.

The first flow 122 is segregated from the second flow 124 downstream of the flex seal 110 via a secondary seal 120 that seals the cooling air passage 126 to the flex seal 110. The secondary seal 120 can be a w-seal, a feather seal, a bellows seal, a diaphragm seal, a brush-seal, or any other applicable seal. The first flow 122 and the second flow 124 pass through corresponding sets of openings, such as through holes, in the flex seal 124.

Figure 3:
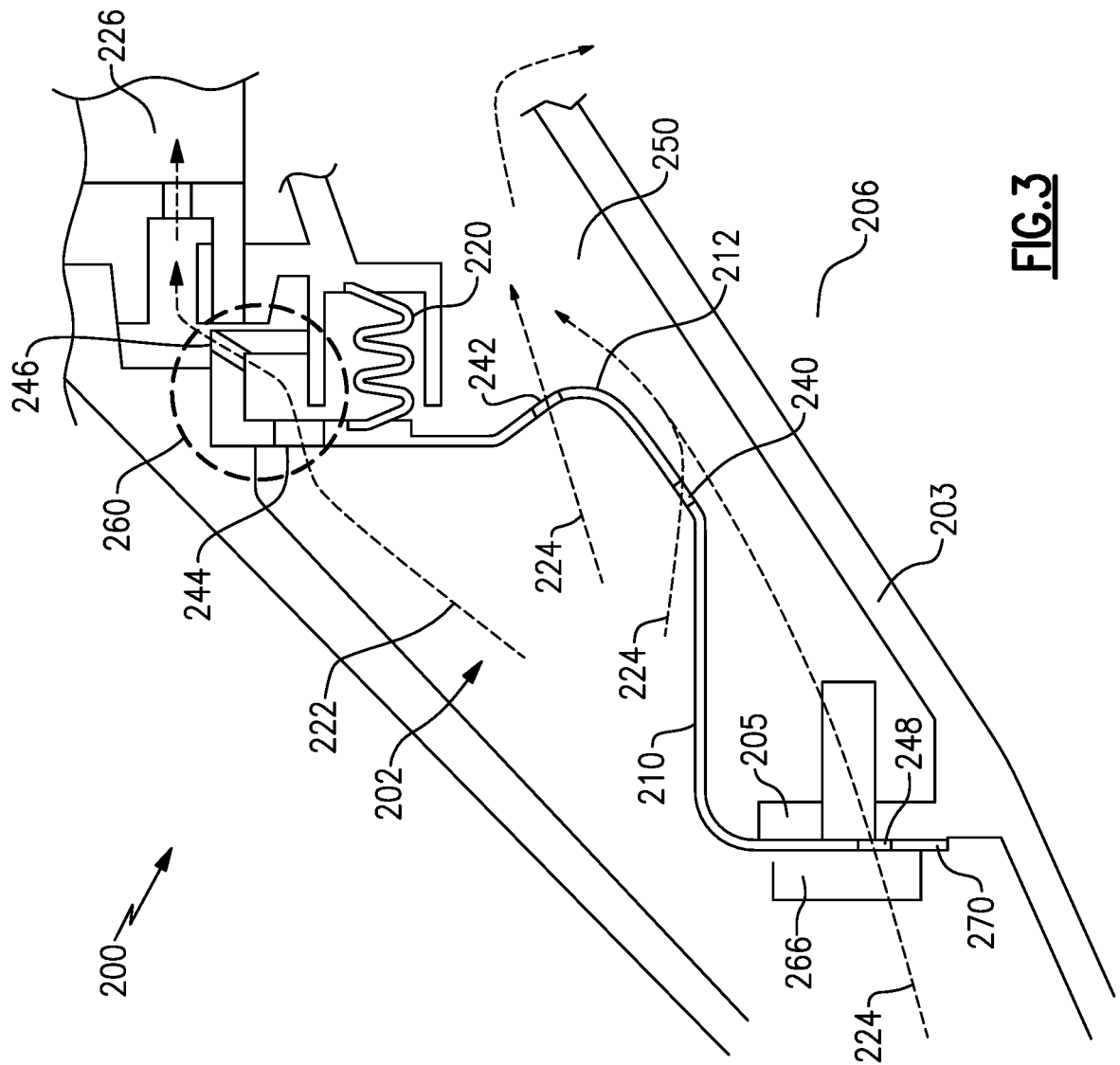
FIG. 3 is a schematic view of an example flex seal configuration within a turbine cooling air flow.

With continued reference to FIG. 2, and with like numerals indicating like elements, FIG. 3 schematically illustrates an exemplary flex seal 200 configuration in greater detail. The illustrated section includes a cooling air flowpath 202 that is bifurcated using the combination of the flex seal 210 and the secondary 220. Downstream of the combined flex seal 210 and the secondary 220, the is separated into two isolated portions, a purge cavity 250 and a cooling air passage 226. The cooling air passage 226 directs cooling air to another cooling air system within the engine. The flex seal 210 of FIG. 2 includes a single convolution 212 and three sets of through holes 240, 242, 248 allowing fluid flows 224 to pass through the radially inner portion of the flex seal 210 into a purge air cavity 250. Also included is a fourth set of holes 244, 246 disposed radially outward of the secondary seal 220. The fourth set of holes 244, 246 provide a flowpath through the radially outward connection portion 260 into the cooling air passage 226.

The cooling air passage 226 is sealed to the flex seal 210 via the secondary seal 220. In the example of FIG. 3, the secondary 220 seal is a w-seal. In alternative examples, the w-seal can be replaced with similarly functioning seals to the same effect.

The radially inward end 270 of the flex seal 210 is mechanically fastened to the inner diameter 203 via fasteners 262 that protrude through the flex seal 210, and through a radially outwardly extending flange 205 of the inner diameter 203. In alternative examples, alternative mechanical connections can provide a similar connection.

During operation off the gas turbine engine, a fluid (such as air) flows through the cooling air passage 202 up to the flex seal 210. Rather than being routed around the flex seal 210, or otherwise bypassing the flex seal, the air is passed through the openings 240, 242, 244, 246, 248 and bifurcated by the seal arrangement. In prior art applications, cooling air is not provisioned by or through the flex seal 210 but is routed around the seal, increasing flowpath complexity and potential leakage.

The configuration of FIG. 3 results in three distinct pressure zones: a first, high pressure zone (the cooling air passage 202), a mid-pressure zone (purge cavity 230), and a low pressure zone (the primary flowpath 206

Figure 4:
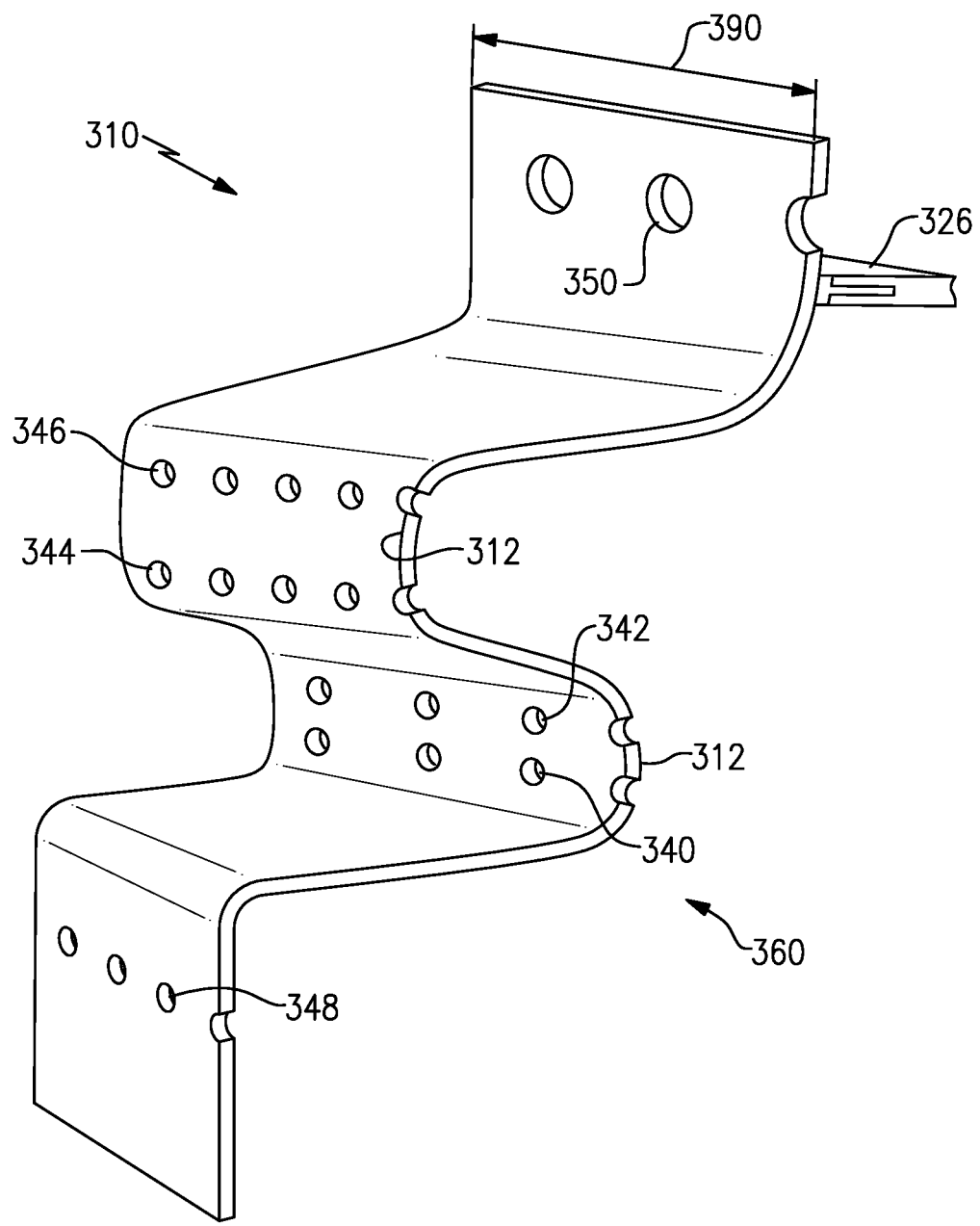
FIG. 4 schematically illustrates an isometric view of an example flex seal including two convolutions.

With continued reference to the flex seal configurations of FIGS. 2 and 3, and with like numerals indicating like elements, FIG. 4 schematically illustrates an isometric view of a flex seal example having two convolutions 312, and five sets 340, 342, 344, 346, 348 of pass through holes in the lower portion of the flex seal 310 feeding into a purge cavity 360 and one set 350 of pass through holes in the upper portion feeding fluid into the cooling air passage 326.

The illustrated flex seal 310 is one section of a set of seals 310 arranged in a ring and disposed as illustrated in the example of FIGS. 2 and 3 in an annular configuration. The circumferential length 390, and the arc of each flex seal 310 is application dependent and will vary depending on the design specifications of the particular engine incorporating the flex seal 310. Further, although the engine 20 of FIG. 1 includes only a single flex seal according to this configuration, it should be understood that when additional bifurcations of the cooling air flow are requires, additional rings of flex seal seals 310 can be included.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine comprising:
   a primary flow path fluidly connecting a compressor section, a combustor section and a turbine section;
   a cooling air flowpath radially outward of the primary flowpath;
   a first seal spanning from an inner diameter of the cooling air flowpath to an outer diameter of the cooling air flowpath, the first seal including at least one axial convolution and a plurality of pass through features;

a bifurcation feature provided by the first seal and a second seal, the bifurcation feature being configured to direct a portion of an airflow through the first seal into a cooling air passage; and the second seal contacting the first seal, such that another portion of the airflow passes radially inward of the bifurcation feature.

2. The gas turbine engine of claim 1, wherein the second seal is one of a w-seal, a feather seal, a bellows seal, a diaphragm seal, and a brush-seal.

3. The gas turbine engine of claim 1, wherein the at least one axial convolution includes from one to five axial convolutions.

4. The gas turbine engine of claim 3, wherein the at least one axial convolution is three axial convolutions.

5. The gas turbine engine of claim 1, wherein the first seal is connected to the inner diameter of the cooling air flowpath via fastener.

6. The gas turbine engine of claim 1, wherein the first seal is connected to the outer diameter of the cooling air flowpath via a fastener.

7. The gas turbine engine of claim 1, wherein the first seal is press fit to the outer diameter of the cooling air flowpath.

8. The gas turbine engine of claim 1, wherein the first seal is radially outward of a low pressure turbine section.

9. The gas turbine engine of claim 1, wherein the turbine cooling air flowpath is isolated from a purge air cavity.

10. The gas turbine engine of claim 1, wherein the plurality of pass through features includes a first set of purge holes and a second set of purge holes.

11. The gas turbine engine of claim 10, wherein the first set of purge holes fluidly connect the turbine cooling air to a purge air cavity.

12. The gas turbine engine of claim 10, wherein the second set of purge holes fluidly connect the turbine cooling air to the turbine cooling air flowpath.

13. A method of bifurcating an airflow within a gas turbine engine comprising:

disposing a flex seal within a cooling air flowpath, the flex seal including at least a first set of pass through holes connecting the cooling air flowpath to a purge cavity and a second set of pass through holes connecting the cooling air flowpath to a cooling air passage;

isolating the cooling air passage from the purge cavity using a secondary seal disposed between an end of the cooling air passage and the flex seal; and passing an airflow through the first set of pass through holes and through the second set of pass through holes.

14. The method of claim 13, wherein the flex seal includes multiple axial convolutions.

15. The method of claim 14, wherein the multiple axial convolutions includes one to five axial convolutions.

16. The method of claim 15, wherein the multiple axial convolutions consists of three convolutions.

17. The method of claim 13, further comprising maintaining the flex seal in position relative a radially inner diameter via at least one fastener, the at least one fastener protruding through the flex seal and a corresponding flange.

18. The method of claim 13, further comprising maintaining the flex seal in position against a radially outer diameter via a press fit.

19. The method of claim 13, wherein the secondary seal is one of a w-seal, a feather seal, a bellows seal, a diaphragm seal, a brush-seal.

* * * * *